United States Patent [19]

Roberts et al.

[11] Patent Number: 4,543,105
[45] Date of Patent: Sep. 24, 1985

[54] MODIFICATION OF LIQUID HYDROCARBONS

[75] Inventors: John S. Roberts, Berkshire; Frederick A. Waite, Buckinghamshire, both of England

[73] Assignee: Imperial Chemical Industries PLC, London, England

[21] Appl. No.: 534,120

[22] Filed: Sep. 20, 1983

[30] Foreign Application Priority Data

Sep. 16, 1983 [GB] United Kingdom ................ 8324903

[51] Int. Cl.$^4$ ............................ C10L 1/18; C10L 1/22
[52] U.S. Cl. ............................................ 44/55; 44/53; 44/56; 44/72; 523/335; 524/251; 524/391; 526/320; 526/329.2; 526/331; 526/342; 526/347; 526/318.41; 526/318.45; 526/318.5; 526/318.6; 528/491; 528/492; 528/496; 528/499
[58] Field of Search ............ 523/335; 526/347, 329.2, 526/317; 528/492, 491, 496; 44/53, 55, 72; 524/251

[56] References Cited

U.S. PATENT DOCUMENTS

| 2,161,949 | 6/1939 | Calcott et al. | 528/492 X |
| 2,576,909 | 12/1951 | Adams | 528/492 X |
| 3,629,211 | 12/1971 | Nozaki | 525/227 X |
| 4,356,003 | 10/1982 | Brooks et al. | 526/317 X |
| 4,442,272 | 4/1984 | Brooks et al. | 526/317 X |

FOREIGN PATENT DOCUMENTS 2048937A 12/1980 United Kingdom .

Primary Examiner—Joseph L. Schofer
Assistant Examiner—S. Babajko
Attorney, Agent, or Firm—Cushman, Darby & Cushman

[57] ABSTRACT

Improved rate of dissolution in liquid hydrocarbon fuels, of specified tert-butylstyrene copolymers capable of imparting anti-misting characteristics to the fuel, is obtained when the copolymer, following its production by aqueous emulsion polymerization of the monomers, is isolated from the resulting latex by a process of flocculation, separation, washing and drying at moderate temperatures. The copolymer thus isolated is advantageously incorporated in the liquid fuel in the form of a slurry with a hydroxylic liquid and an amine.

28 Claims, No Drawings

MODIFICATION OF LIQUID HYDROCARBONS

This invention relates to the production of copolymers of tert-butylstyrene which are of particular interest and value as additives to liquid hydrocarbon fuels, in particular to aviation kerosene, for the purpose of reducing the tendency of such fuels to form inflammable mists when subjected to shock.

It is known that when a liquid with a free surface is subjected to conditions of shock there is a tendency for the liquid to become disseminated in particulate form, and that the effect of shock may be such as to convert a proportion of the liquid into a dispersion of fine liquid droplets in air, i.e. a mist.

It is very desirable to be able to control the extent to which such a dispersion or mist of liquid is formed under shock conditions since this mist, if inflammable, may constitute a hazard. A situation in which it is most important to keep to a minimum the formation of such mist under shock conditions is the crash of an aircraft carrying inflammable liquids, in particular its fuel. Though hydrocarbon fuels now used for aircraft gas turbine engines may be of a higher flash point than aviation gasoline as used in spark-ignition engines, with a consequent reduction in the risk of fire due to ignition of vapour, nevertheless mists of fuels with flash points of 80° F. and higher are highly susceptible to ignition by flames, electrical sparking or the effect of friction, as well as by the presence of hot metal in the engines. There is therefore a considerable fire hazard immediately after a crash of an aircraft using such fuel. Furthermore, there is the risk of propagation of fire to the bulk of liquid fuel even if little damage is caused by ignition of the mist itself.

It has been found that the tendency to particulate dissemination under shock conditions of a liquid hydrocarbon fuel suitable for use in gas turbined aircraft and having a flash point of at least 80° F. may be reduced by dissolving in the liquid certain copolymers of tert-butylstyrene. Such copolymers, their production and their addition to liquid aircraft fuels have been described in British Published Specifications Nos. 2045778 A and 2084160 A (U.S. Pat. No. 4,356,003 and U.S. application Ser. No. 293,334, U.S. Pat. No. 4,442,272, respectively). In general, it has been preferred to produce the copolymers by aqueous emulsion polymerisation of the monomers under certain defined conditions. It is then necessary to transfer the copolymers from its state as particles of colloidal dimensions stably dispersed in the resulting aqueous latex, into a state of solution in the aircraft fuel. This involves two essential steps: (i) isolation of the copolymer from the latex; (ii) dissolution of the isolated material in the fuel. For a number of reasons, it is impracticable to carry out the second of these steps at any stage except immediately prior to or during the actual loading of a charge of fuel into an aircraft. However, if the polymer is to be introduced during the course of that operation, it is necessary to achieve rapid dissolution of the polymer in view of the high flow rate at which refuelling is normally carried out. We have already described, in British Patent Specification No. 1,384,536 and in British Published Specification No. 2 048 937 A, methods whereby the dissolution of polymer in the fuel may be substantially assisted. So far as the first step mentioned above, i.e. the isolation of the polymer from the latex, is concerned, the procedure which has been adopted hitherto is that of spray-drying the latex. It has in practice been found, however, using spray-dried polymer, that although adequate anti-misting characteristics develop within 15 minutes of the introduction of the polymer into the fuel, the polymer is not at that stage completely in solution and the blend does not become acceptable to the aircraft fuel system until a further 1–2 hours has elapsed.

We have now found that a substantial improvement in the dissolution rate shown by the copolymers in question can surprisingly be obtained if the polymer is isolated from the latex in which it is prepared by a process of flocculation and separation, rather than by spray-drying of the latex.

Thus according to the present invention we provide a method for the isolation in solid form, from a latex in which it has been prepared by aqueous emulsion polymerisation of the constituent monomers, of a copolymer of (i) from 75% to 98% by weight of tert-butylstyrene, (ii) from 1% to 24% by weight of a second monomer selected from the acrylic and methacrylic esters of monohydric alcohols containing from 1 to 4 carbon atoms, 2-ethoxyethyl methacrylate, acrylonitrile, vinyl acetate, styrene and vinyl toluene, and (iii) from 1% to 10% by weight of methacrylic acid, where the aggregate weight of monomers (i), (ii) and (iii) is 100%, the method consisting in the flocculation of the particles of copolymer in the latex by the addition to the latex of an agent capable of destabilising the particles therein, and separating the flocculated copolymer from the other constituents of the latex.

Flocculation of the latex can be achieved in a number of ways. Suitable flocculating agents include aqueous solutions of quaternary ammonium salts and water-miscible organic liquids which are non-solvents for the latex copolymer. The preferred quaternary ammonium salt flocculants are those generally known as fatty quaternary ammonium salts, containing in the molecule at least one organic residue attached to the nitrogen atom which contains at least 6 carbon atoms. An example of such a quaternary ammonium salt is cetyltrimethylammonium bromide. A particularly suitable water-miscible organic liquid flocculating agent is methanol. The person skilled in the art of preparing polymers by aqueous emulsion polymerisation will be able to choose the appropriate type of flocculating agent for any individual latex having regard to the manner in which the latex was prepared, if necessary with the aid of simple experimentation. The optimum proportion of the agent to be added to the latex can also readily be found by experiment.

The addition of the flocculating agent to the latex is preferably carried out gradually and with sufficiently effective stirring to ensure that the mixture remains as homogeneous as possible throughout the addition. In some cases, the mixture temporarily becomes a thick slurry and it is important that no localised excesses of flocculating agent are allowed to form at that stage.

After flocculation, the copolymer is conveniently separated from the liquid phase by filtration or centrifugation. The separated solid may then be washed free from adhering impurities with water and/or with a suitable water-miscible non-solvent organic liquid, such as methanol. Finally, the solid copolymer is dried at ambient temperature, or a slightly elevated temperature, e.g. up to about 50° C., until it attains a consistency such that it may be ground to a powder of sufficient fineness to render it suitable for addition to a liquid hydrocarbon fuel. A suitable degree of fineness is such as will pass through a sieve of mesh in the range 50–150 μm.

Preferably, the copolymer powder finally produced is introduced into the hydrocarbon fuel by one of the methods described in British Published Specification No. 2 048 937 A. Thus the copolymer may be blended with a hydroxylic liquid, such as 2-methyl-2:4-pentanediol, which is a non-solvent for the copolymer but is miscible with the fuel, and with a specified proportion of an amine, such as n-butylamine, so as to form a slurry which is subsequently mixed into the fuel. Alternatively, the slurry may consist of the copolymer blended with the hydroxylic liquid only, this slurry being mixed into the fuel and the amine also being added to the fuel either simultaneously or subsequently. As a further alternative, the copolymer powder alone may be mixed into the fuel and both the hydroxylic liquid and the amine used added subsequently. The amount of the amine used is preferably from 0.01 to 0.6 mole per 100 g of copolymer, and, where the copolymer is introduced as a slurry, this preferably contains from 20% to 40% by weight of the copolymer.

The amount of the copolymer, or of the slurry, which is added to the fuel is chosen so as to give a final concentration of the copolymer in the fuel of from 0.1% to 1% by weight.

The method of the present invention is of particular value for the isolation of copolymers of tert-butylstyrene having the monomer composition previously defined and which have the following additional characteristics:

(a) they are soluble in AVTUR 50 aviation kerosene;

(b) 0.3% by weight solutions of the copolymers in AVTUR 50 aviation kerosene have relative viscosities in the range 1.3 to 2.1 and differential orifice flow rates in the range 3 to 6 ccs. per 30 seconds, the terms "soluble", "AVTUR 50", "relative viscosity and "differential orifice flow rate" having the respective meanings which are hereinafter defined.

By "soluble in AVTUR 50" we mean that solutions of the copolymers in AVTUR 50, at all concentrations in the range 0.05% to 1% by weight, are, notwithstanding that they may appear hazy or opalescent, nevertheless homogeneous in the sense that no gross separation from them of a swollen polymer phase occurs on standing at 20° C.

By "AVTUR 50" we mean a liquid hydrocarbon fuel complying with U.K. Government Specification D.Eng.RD 2494 (NATO Code No. F-35). AVTUR 50 has a flash point not lower than 100° F., and normally has a viscosity of 1.0–1.5 cp at 25° C.

By "relative viscosity" we mean the ratio of (i) the viscosity of a 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (ii) the viscosity of AVTUR 50 when measured under those same conditions.

By "differential orifice flow rate" we mean the difference between (a) the flow rate of a 0.3% by weight solution of copolymer in AVTUR 50 through a passage of circular cross-section having a square-edged orifice, the passage having a length of 0.062 inches and a diameter of 0.025 inches, and (b) the flow rate through the same said passage of a Newtonian liquid having the same viscosity as that of the copolymer solution referred to in (a) when the said viscosities are measured by the method of British Standard No. 188:1937, the flow rates being expressed as the volume of liquid in ccs. which passes through the orifice during the second period of 30 seconds of flow. Apparatus suitable for carrying out the differential orifice flow rate determination may be constructed by appropriately modifying a type A viscosity cup as defined by British Standard No. 1733.

The above-defined copolymers have been shown to be very useful as additives to liquid hydrocarbon fuels for the purpose of diminishing mist formation under shock conditions, as referred to above. Members of this class of copolymers which are of particular interest for this purpose are those in which the second monomer constituent is methyl methacrylate, and especially those having the composition (i) from 81% to 85% by weight of tert-butylstyrene, (ii) from 9% to 11% by weight of methyl methacrylate and (iii) from 6% to 9% by weight of methacrylic acid. Particularly effective anti-misting characteristics are shown by such copolymers having a differential orifice flow rate, as defined above, in the range 4.0 to 5.5 ccs per 30 seconds.

Liquid hydrocarbon fuels which are widely used and are suitable for modification with copolymers isolated according to the invention include AVTUR 50 aviation kerosene, as hereinabove defined, and other aviation turbine fuels such as JP-8 (flash point 110° F. min) as specified in U.S. Military Specification MIL-T-83133, JP-5 (flash point 140° F. min) as specified in U.S. Military Specification MIL-T-5624G, and Jet A and Jet A-1 (flashpoint 110° F. min) as specified in ASTM Specification D 1655/68.

For a given liquid fuel and a given copolymer as defined above, we find that copolymer isolated from its latex by the flocculation method of the invention shows a significantly higher rate of dissolution in the fuel than the copolymer isolated from the same latex by means of spray-drying. A convenient method of assessing dissolution rate is to observe the decrease in turbidity of a sample as a function of time, with the aid of a nephelometer.

The invention is illustrated by the following Examples, in which parts are by weight.

COMPARATIVE EXAMPLE

A mixture of tert-butylstyrene, methyl methacrylate and methacrylic acid in the weight ratio 83:10:7 was polymerised in the manner described in Example 1 of British Specification No. 2 045 778A (U.S. Pat. No. 4,356,003).

The resulting latex was spray dried under conventional conditions (with an outlet temperature of about 100° C.), to yield a free-flowing, fine particle-size powder.

The powder was split into three portions:

The first portion of powder (32 parts) was blended in a heavy duty mixer with a mixture of a commercial grade of 2-methyl-2:4-pentane diol (66.4 parts) and n-butylamine (1.6 parts). Mixing was continued until the blend was homogeneous. This mixture was designated Slurry $A_1$.

The second portion of powder was mixed in a similar manner except that the proportions used were: powder (30 parts), 2-methyl-2:4-pentane diol (68.5 parts) and n-butylamine (1.5 parts). This mixture was designated Slurry $A_2$.

The third portion of powder was similarly blended except that in this case the proportions were: powder (25 parts), 2-methyl-2:4-pentane diol (73.75 parts) and n-butylamine (1.25 parts). This mixture was designated Slurry $A_3$.

EXAMPLE 1

A mixture of tert-butylstyrene, methyl methacrylate and methacrylic acid in the weight ratios 83:10:7 was polymerised in the manner described in Example 1 of British Specification No. 2 045 778A (U.S. Pat. No. 4,356,003).

A portion of the latex was treated in the following manner according to the present invention. A solution was prepared of 0.82 parts of cetyltrimethylammonium bromide in 200 parts of water. This solution was drip fed, over a period of about 15 minutes, into a mixture of 200 parts of the latex and 200 parts of water. Throughout the addition of the solution, the mixture was stirred sufficiently to ensure its homogeneity and to avoid the the occurrence of any localised excesses of the solution, especially during the intermediate stage when the mixture temporarily assumed the consistency of a thick slurry. When the addition was complete, the resulting suspension was filtered and the polymer solid filter cake was washed successively with four 200-part portions of water. The washed filter cake was then dried in a fan-assisted oven at 40° C. for 24 hours, by which time the cake had become friable. The cake was ground to a powder of fineness sufficient to pass through a 150 μm- mesh sieve.

The powder thus obtained (32 parts) was blended in a heavy duty mixer with 62 parts of 2-methyl-2:4-pentane diol. A mixture of 1.6 parts of n-butylamine and 4.4 parts of 2-methyl-2:4-pentane diol was then added, and mixing was continued until the material was homogeneous. The slurry thus obtained was designated Slurry B.

EXAMPLE 2

The procedure of Example 1 was repeated except that the washed filter cake was dried at ambient temperature (20°–25° C.) for 4–5 days and the resulting powder was blended in the proportions of powder (30 parts), 2-methyl-2:4-pentane diol (68.5 parts) and n-butylamine (1.5 parts). The resulting mixture was designated Slurry C.

EXAMPLE 3

The procedure of Example 2 was followed except that the powder was blended in the proportions of powder (25 parts), 2-methyl-2:4-pentane diol (73.75 parts) and n-butylamine (1.25 parts). The resulting mixture was designated Slurry D.

EXAMPLE 4

Into 200 parts of a copolymer latex produced as described in Example 1, there was drip-fed, over a period of about 20 minutes, 300 parts of methanol; the mixture was stirred throughout the addition at such a rate that the methanol was rapidly incorporated and the mixture maintained as near homogeneous as possible. When the addition was complete, the resulting copolymer suspension was filtered and filter cake washed twice with a 1:2 mixture of water and methanol (300 parts each portion) and then twice with methanol (300 parts). The washed filter cake was dried by exposure to the air at ambient temperature for two days, until the cake had assumed a friable consistency. The cake was then ground to a powder of sufficient fineness to pass through a 53-μm mesh sieve.

The powder (30 parts) was blended with 2-methyl-2:4-pentane diol (68 parts) containing n-butylamine (1.5 parts) and water (0.5 part) until the mixture was homogeneous. The slurry thus obtained was designated Slurry E.

EXAMPLE 5

The dissolution rate in Jet A-1 aviation kerosene of Slurries $A_1$, $A_2$ and $A_3$ were compared with those of Slurries B, C, D and E under conditions of similar copolymer concentration. The dissolution rates were assessed by observing the changes in turbidity of mixtures of the slurries and kerosene as a function of time, using the commercially available Model 40 series nephelometer supplied by Turner Designs of California, U.S.A.

The mixtures were prepared by rapidly injecting the appropriate amount of each slurry into a measured amount of Jet A-1 kerosene whilst the latter was being vigorously stirred (for example, in the case of Slurry $A_1$, 1 part of the slurry was injected into 99 parts of the kerosene, to give a concentration of polymer of 0.3% by weight). As soon as each slurry was completely dispersed in the kerosene, stirring was stopped and a sample of the mixture was transferred to the nephelometer; turbidity measurements were begun as soon as possible and continued at frequent time intervals until a substantially constant value was observed. A selection of the results thus obtained as shown in the following Table 1, these demonstrate the improved rate of dissolution exhibited by copolymer isolated by the method of the invention, as compared with that isolated by spray-drying. Table 1 also records the differential orifice flow rates of each Jet A-1/slurry mixture, measured 24 hours after the introduction of the slurry.

TABLE 1

| Slurry | Copolymer solids content, % by wt. | Copolymer concentration in kerosene, % by wt. | Nephelometer readings (arbitrary units): time after initial mixing. | | | | Differential orifice flow rate. ccs/30 secs. |
|---|---|---|---|---|---|---|---|
| | | | 2 mins | 15 mins | 30 mins | 24 hrs | |
| $A_1$ | 32 | 0.3 | 54 | 27 | 18.5 | 9 | 3.4 |
| $A_2$ | 30 | 0.3 | 102 | 31 | 17 | 8.5 | 4.5 |
| $A_3$ | 25 | 0.2 | 32 | 39 | 28 | 6.4 | 4.1 |
| B | 32 | 0.3 | 51 | 13 | 9.7 | 7.7 | 3.4 |
| C | 30 | 0.3 | 26 | 9 | 8 | 7.5 | 3.3 |
| D | 25 | 0.2 | 30.5 | 8 | 6 | 5 | 3.2 |
| E | 30 | 0.3 | 46 | 11 | 9 | 8 | 4.5 |

EXAMPLE 6

To 288 parts of Jet A-1 aviation kerosene there was added 0.9 part of the flocculated, washed, dried and sieved copolymer powder described in Example 1. The addition was made over a period of 30 seconds whilst the kerosene was being vigorously stirred. There was then added, with only gentle stirring and over a period of 15 seconds, a mixture of 1.8 parts of 2-methyl-2:4-pentanediol and 6.0 parts of Jet A-1 kerosene. A sample of the mixture was transferred to a nephelometer and the change of turbidity with time determined as described in Example 5. A selection of the results obtained is shown in Table 2 below. After the kerosene mixture had stood at room temperature for 24 hours, a blend of 0.045 part of n-butylamine and 3.255 parts of Jet A-1 kerosene were added to it with gentle stirring; the differential orifice flow rate of the total mixture was then determined, with the result shown in Table 2.

The above procedure was repeated but using, instead of the copolymer powder as described in Example 1, the spray-dried copolymer powder described in the Comparative Example. The corresponding turbidity and differential orifice flow rate values obtained are also shown in Table 2.

It will be seen that, again, the turbidity measurements demonstrate the improved rate of dissolution exhibited by copolymer isolated by the method of the invention.

TABLE 2

| Copolymer | Copolymer Concentration in kerosene % by wt. | Nephelometer readings (arbitrary units): time after initial mixing | | | | Differential orifice flow rate ccs/30 secs |
|---|---|---|---|---|---|---|
| | | 2 min | 15 min | 30 min | 24 hr | |
| As in Example 1 | 0.3 | 21.6 | 7.5 | 7.1 | 6.5 | 4.93 |
| As in Comparative Example | 0.3 | 48.1 | 15.8 | 11.8 | 8.0 | 5.08 |

The differential orifice flow rate values recorded in Tables 1 and 2 indicate that the modified liquid hydrocarbon fuels referred to will possess an adequate ability to minimise mist formation under shock conditions, and hence to suppress the risk of fire in the case of the crash of an aircraft fuelled by them. The relationship between differential orifice flow rate and fire-suppression ability is demonstrated, for instance, by the example in British Published Specification No. 2 048 937 A (U.S. Pat. No. 4,292,045).

We claim:

1. A method for the isolation in solid form, from a latex in which it has been prepared by aqueous emulsion polymerisation of the constituent monomers, of a copolymer of (i) from 75% to 98% by weight of tert-butylstyrene, (ii) from 1% to 24% by weight of a second monomer selected from the acrylic and methacrylic esters of monohydric alcohols containing from 1 to 4 carbon atoms, 2-ethoxyethyl methacrylate, acrylonitrile, vinyl acetate, styrene and vinyl toluene, and (iii) from 1% to 10% by weight of methacrylic acid, where the aggregate weight of monomers (i), (ii) and (iii) is 100%, the method consisting in the flocculation of the particles of copolymer in the latex by the addition to the latex of a flocculating agent capable of destabilising the particles therein selected from the group consisting of an aqueous solution of a quaternary ammonium salt containing in the molecule at least one organic residue attached to the nitrogen atom which contains at least 6 carbon atoms and a water-miscible organic liquid which is a non-solvent for the copolymer, and separating the flocculated copolymer from the other constituents of the latex.

2. A method as claimed in claim 1, wherein the flocculating agent is an aqueous solution of a quaternary ammonium salt containing in the molecule at least one organic residue attached to the nitrogen atom which contains at least 6 carbon atoms.

3. A method as claimed in claim 2, wherein the quaternary ammonium salt is cetyltrimethylammonium bromide.

4. A method as claimed in claim 1, wherein the flocculating agent is a water-miscible organic liquid which is a non-solvent for the copolymer.

5. A method as claimed in claim 4, wherein the flocculating agent is methanol.

6. A method as claimed in claim 1, wherein, after flocculation, the copolymer is separated from the liquid phase by filtration.

7. A method as claimed in claim 6, wherein the separated copolymer is subsequently washed free from adhering impurities with water and/or methanol.

8. A method as claimed in claim 7, wherein the washed copolymer is subsequently dried at ambient temperature or at a temperature up to about 50° C.

9. A method as claimed in claim 1, wherein the copolymer has the following additional characteristics:

(A) solutions of the copolymer in AVTUR 50 aviation kerosene, at all concentrations in the range 0.05% to 1% by weight, are, notwithstanding that they may appear hazy or opalescent, nevertheless homogeneous in the sense that no gross separation from them of a swollen polymer phase occurs on standing at 20° C., AVTUR 50 being a liquid hydrocarbon fuel complying with U.K. Government Specification D.Eng.RD 2494 (NATO Code No. F-35);

(B) A 0.3% by weight solution of the copolymer in AVTUR 50 aviation kerosene has a relative viscosity in the range of 1.3 to 2.1 and a differential orifice flow rate in the range 3 to 6 ccs. per 30 seconds, the said relative viscosity being the ratio of (a) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (b) the viscosity of AVTUR 50 when measured under those same conditions, and the said differential orifice flow rate being the difference between (c) the flow rate of a 0.3% by weight solution of the copolymer in AVTUR 50 through a passage of circular cross-section having a square-edged orifice, the passage having a length of 0.062 inches and a diameter of 0.025 inches, and (d) the flow rate through the same passage of a Newtonian liquid having the same viscosity as that of the copolymer solution referred to in (c) when the said viscosities are measured by the method of British Standard No. 188:1937, the flow rates being expressed as the volume of liquid in ccs. which passes through the orifice during the second period of 30 seconds of flow.

10. A method as claimed in claim 9, wherein the second monomer constituent of the copolymer is methyl methacrylate.

11. A method as claimed in claim 10, wherein the copolymer has the composition (i) from 81% to 85% by weight of tert-butylstyrene, (ii) from 9% to 11% by weight of methyl methacrylate and (iii) from 6% to 8% by weight of methacrylic acid.

12. A method as claimed in claim 9, wherein the copolymer has a differential orifice flow rate in the range 4.0 to 5.5 ccs. per 30 seconds.

13. A copolymer prepared by aqueous emulsion polymerisation of a mixture of (i) from 75% to 98% by weight of tert-butylstyrene, (ii) from 1% to 24% by weight of a second monomer selected from the acrylic and methacrylic acid esters of monohydric alcohols containing from 1 to 4 carbon atoms, 2-ethoxyethyl methacrylate, acrylonitrile, vinyl acetate, styrene and vinyl toluene, and (iii) from 1% to 10% by weight of methacrylic acid, the aggregate weight of monomers (i), (ii) and (iii) being 100%, the said copolymer having been isolated from the resulting latex by flocculation of the particles of copolymer therein by the addition to the latex of a flocculating agent capable of destabilizing the particles therein selected from the group consisting of an aqueous solution of a quaternary ammonium salt containing in the molecule at least one organic residue attached to the nitrogen atom which contains at least 6 carbon atoms and a water-miscible organic liquid which is a non-solvent for the copolymer, and subsequent separation of the flocculated copolymer from the other constituents of the latex.

14. A copolymer as claimed in claim 13, prepared by aqueous emulsion polymerisation of a mixture of (i) from 81% to 85% by weight of tert-butylstyrene, (ii) from 9% to 11% by weight of methyl methacrylate and (iii) from 6% to 8% by weight of methacrylic acid, the aggregate weight of monomers being 100%, the copolymer having the following additional characteristics:

(A) solutions of the copolymer in AVTUR 50 aviation kerosene, at all concentrations in the range 0.05% to 1% by weight, are, notwithstanding that they may appear hazy or opalescent, nevertheless homogeneous in the sense that no gross separation from them of a swollen polymer phase occurs on standing at 20° C. AVTUR 50 being a liquid hydrocarbon fuel complying with U.K. Government Specification D.Eng.RD 2494 (NATO Code No. F-35);

(B) A 0.3% by weight solution of the copolymer in AVTUR 50 aviation kerosene has a relative viscosity in the range 1.3 to b 2.1 and a differential orifice flow rate in the range 4.0 to 5.5 ccs. per 30 seconds, the said relative viscosity being the ratio of (a) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (b) the viscosity of AVTUR 50 when measured under those same conditions, and the said differential orifice flow rate being the difference between (c) the flow rate of a 0.3% by weight solution of the copolymer in AVTUR 50 through a passage of circular cross-section having a square-edged orifice, the passage having a length of 0.062 inches and a diameter of 0.025 inches, and (d) the flow rate through the same said passage of a Newtonian liquid having the same viscosity as that of the copolymer solution referred to in (c) when the said viscosities are measured by the method of British Standard No. 188:1937, the flow rates being expressed as the volume of liquid in ccs. which passes through the orifice during the second period of 30 seconds of flow.

15. A copolymer prepared by aqueous emulsion polymerisation of a mixture of (i) from 75% to 98% by weight of tert-butylstyrene, (ii) from 1% to 24% by weight of a second monomer selected from the acrylic and methacrylic acid esters of monohydric alcohols containing from 1 to 4 carbon atoms, 2-ethoxyethyl methacrylate, acrylonitrile, vinyl acetate, styrene and vinyltoluene, and (iii) from 1% to 10% by weight of methacrylic acid, the aggregate weight of monomers being 100%, the said copolymer having been isolated from the resulting latex by flocculation of the particles of copolymer therein by the addition to the latex of an aqueous solution of cetyltrimethylammonium bromide, followed by separation of the flocculated copolymer from the other constituents of the latex, washing of the separated copolymer with water and drying of a washed copolymer for 24 hours at 40° C.

16. A copolymer as claimed in claim 15, prepared by aqueous emulsion polymerisation of a mixture of (i) from 81% to 85% by weight of tert-butylstyrene, (ii) from 9% to 11% by weight of methyl methacrylate and (iii) from 6% to 8% by weight of methacrylic acid, the aggregate weight of monomers being 100%, the copolymer having the following additional characteristics:

(A) solutions of the copolymer in AVTUR 50 aviation kerosene, at all concentrations in the range 0.05% to 1% by weight, are, notwithstanding that they may appear hazy or opalescent, nevertheless homogeneous in the sense that no gross separation from them of a swollen polymer phase occurs on standing at 20° C., AVTUR 50 being a liquid hydrocarbon fuel complying with U.K. Government Specification D.Eng.RD 2494 (NATO Code No. F-35);

(B) A 0.3% by weight solution of the copolymer in AVTUR 50 aviation kerosene has a relative viscosity in the range 1.3 to 2.1 and a differential orifice flow rate in the range 4.0 to 5.5 ccs. per 30 seconds, the said relative viscosity being the ratio of (a) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (b) the viscosity of AVTUR 50 when measured under those same conditions, and the said differential orifice flow rate being the difference between (c) the flow rate of a 0.3% by weight solution of the copolymer in AVTUR 50 through a passage of circular cross-section having a square-edged orifice, the passage having a length of 0.062 inches and a diameter of 0.025 inches, and (d) the flow rate through the same said passage of a Newtonian liquid having the same viscosity as that of the copolymer solution referred to in (c) when the said viscosities are measured by the method of British Standard No. 188:1937, the flow rates being expressed as the volume of liquid in ccs. which passes through the orifice during the second period of 30 seconds of flow.

17. A slurry suitable for addition to a liquid hydrocarbon fuel, comprising a copolymer as claimed in claim 14, a hydroxylic liquid which is a non-solvent for the copolymer but is miscible with the fuel, and an amine, the slurry containing from 20% to 40% by weight of the copolymer and the amine being present in an amount of from 0.01 to 0.6 mole per 100 g of copolymer.

18. A slurry as claimed in claim 17, wherein the hydroxylic liquid is 2-methyl-2:4-pentanediol and the amine is n-butylamine.

19. A slurry suitable for addition to a liquid hydrocarbon fuel, comprising a copolymer as claimed in claim 16, a hydroxylic liquid which is a non-solvent for the copolymer but is miscible with the fuel, and an amine, the slurry containing from 20% to 40% by weight of the copolymer and the amine being present in an amount of from 0.01 to 0.6 mole per 100 g of copolymer.

20. A slurry as claimed in claim 19, wherein the hydroxylic liquid is 2-methyl-2-4-pentanediol and the amine is n-butylamine.

21. A liquid hydrocarbon fuel containing from 0.1% to 1% by weight of a copolymer as claimed in claim 14.

22. A liquid hydrocarbon fuel containing from 0.1% to 1% by weight of a copolymer as claimed in claim 16.

23. A liquid hydrocarbon fuel to which has been added a slurry as claimed in claim 17 so as to give a concentration of copolymer in the fuel of from 0.1% to 1% by weight.

24. A liquid hydrocarbon fuel to which has been added a slurry as claimed in claim 19 so as to give a concentration of copolymer in the fuel of from 0.1% to 1% by weight.

25. A copolymer prepared by aqueous emulsion polymerisation of a mixture of (i) from 75% to 98% by weight of tert-butylstyrene, (ii) from 1% to 24% by weight of a second monomer selected from the acrylic and methacrylic acid esters of monohydric alcohols containing from 1 to 4 carbon atoms, 2-ethoxyethyl methacrylate, acrylonitrile, vinyl acetate, styrene and vinyl toluene, and (iii) from 1% to 10% by weight of methacrylic acid, the aggregate weight of monomers being 100%, the said copolymer having been isolated from the resulting latex by flocculation of the particles of copolymer therein by the addition to the latex of methanol, followed by separation of the flocculated copolymer from the other constituents of the latex, washing of the separated copolymer with water and drying of the washed copolymer for 24 hours at 40° C.

26. A copolymer as claimed in claim 25, prepared by aqueous emulsion polymerisation of a mixture of (i) from 81% to 85% by weight of tert-butyl styrene, (ii) from 9% to 11% by weight of methyl methacrylate and (iii) from 6% to 8% by weight of methacrylic acid, the aggregate weight of monomers being 100%, the copolymer having the following additional characteristics:

(A) solutions of the copolymer in AVTUR 50 aviation kerosene, at all concentrations in the range 0.05% to 1% by weight, are, notwithstanding that they may appear hazy or opalescent, nevertheless homogeneous in the sense that no gross separation from them of a swollen phase occurs on standing at 20° C., AVTUR 50 being a liquid hydrocarbon fuel complying with U.K. Government Specification D.Eng.RD 2494 (NATO Code No. F-35);

(B) A 0.3% by weight solution of the copolymer in AVTUR 50 aviation kerosene has a relative viscosity in the range 1.3 to 2.1 and a differential orifice flow rate in the range 4.0 to 5.5 ccs. per 30 seconds, the said relative viscosity being the ratio of (a) the viscosity of the 0.3% by weight copolymer solution in AVTUR 50 when measured by the method of British Standard No. 188:1937 "The Determination of the Viscosity of Liquids in C.G.S. Units", Part 2, using a U-tube viscometer, Size A, at 25° C., to (b) the viscosity of AVTUR 50 when measured under those same conditions, and the said differential orifice flow rate being the difference between (c) the flow rate of a 0.3% by weight solution of the copolymer in AVTUR 50 through a passage of circular cross-section having a square-edged orifice, the passage having a length of 0.062 inches and a diameter of 0.025 inches, and (d) the flow rate through the same passage of Newtonian liquid having the same viscosity as that of the copolymer solution referred to in (c) when the said viscosities are measured by the method of British Standard No. 188:1937, the flow rates being expressed as the volume of liquid in ccs. which passes through the orifice during the second period of 30 seconds of flow.

27. A slurry for addition to a liquid hydrocarbon fuel, comprising a copolymer as claimed in claim 26, a hydroxylic liquid which is a non-solvent for the copolymer but is miscible with the fuel, and an amine, the slurry containing from 20% to 40% by weight of the copolymer and the amine being present in an amount of from 0.01 to 0.6 mole per 100 g of copolymer.

28. A slurry as claimed in claim 27, wherein the hydroxylic liquid is 2-methyl-2-4-pentanediol and the amine is n-butylamine.

* * * * *